United States Patent [19]

Smith et al.

[11] Patent Number: 5,478,582
[45] Date of Patent: Dec. 26, 1995

[54] DRY MIXTURE USED FOR PREPARING A COLOR-STABLE LIQUID COMPOSITION

[75] Inventors: William J. Smith, Palatine; Martin J. Moran, Crystal Lake; William F. Racicot, Hawthorn Woods, all of Ill.

[73] Assignee: The Quaker Oats Company, Chicago, Ill.

[21] Appl. No.: 193,818

[22] Filed: Feb. 8, 1994

[51] Int. Cl.$^6$ ............................... A23L 2/39; A23L 2/58
[52] U.S. Cl. .......................... 426/250; 426/540; 426/590
[58] Field of Search ................................... 426/250, 540, 426/590

[56] References Cited

U.S. PATENT DOCUMENTS

| | | | |
|---|---|---|---|
| 4,167,587 | 9/1979 | Danforth | 426/250 |
| 4,497,835 | 2/1985 | Winston | 426/72 |
| 5,300,310 | 4/1994 | Eisen | 426/540 |

OTHER PUBLICATIONS

A Consumers Dictionary of Food Additives, Winter, Crown Pub., Inc., New York p. 91.

*Primary Examiner*—Jeanette Hunter

[57] ABSTRACT

The present invention relates to a dry mixture which provides a color-stable liquid composition when combined with free chlorine-containing water, said dry mixture comprising: (a) from about 0.005% to about 0.035% by weight chlorine reactive agent; (b) from about 0.5% to about 5.0% by weight electrolyte; (c) coloring agent, wherein the dry mixture comprises sufficient coloring agent to provide for a concentration of coloring agent in the range of from about 5 ppm to about 200 ppm in a color-stable liquid composition prepared from said dry mixture; and (d) a balance of carbohydrate. The present invention also relates to a method of preparing a color-stable liquid composition, said method comprising: (a) preparing a dry mixture comprising: (1) from about 0.005% to about 0.035% by weight chlorine reactive agent; (2) from about 0.5% to about 5.0% by weight electrolyte; (3) coloring agent, wherein the dry mixture comprises sufficient coloring agent to provide for a concentration of coloring agent in the range of from about 5 ppm to about 200 ppm in the color-stable liquid composition; and (4) a balance of carbohydrate; and (b) combining said dry mixture with free chlorine-containing water, thereby producing a color-stable liquid composition; wherein the weight ratio of water combined with dry mixture is in the range of from about 10.5:1 to about 22:1 (water:dry mixture), wherein the molar ratio of chlorine reactive agent contained in the dry mixture to free chlorine contained in the water is at least about 2.2:1 (chlorine reactive agent:free chlorine), and wherein the color-stable liquid composition comprises from about 5 ppm to about 200 ppm coloring agent.

14 Claims, No Drawings

DRY MIXTURE USED FOR PREPARING A COLOR-STABLE LIQUID COMPOSITION

FIELD OF INVENTION

The present invention relates to a dry mixture which produces a color-stable liquid composition when combined with water which contains free chlorine. The present invention further relates to a method for preparing such color-stable liquid composition.

BACKGROUND OF INVENTION

Liquid compositions for human consumption come in many flavors and colors. One flavor that is especially popular with consumers is grape. For aesthetic purposes, such grape flavored beverages often have a dark purple color, which consumers typically associate with grape flavor. This is undoubtedly due to the purple color of concord grapes. Another popular flavor is orange. Orange flavored beverages typically have an orange color. Again, this is undoubtedly due to the natural color of the orange fruit.

Of course, with modern flavors it is possible to prepare beverages which are clear and which have different flavors, such as grape and orange. An example of such beverages are flavored waters. However, when formulating compositions having colors which more typically pertain to the composition flavor, e.g., purple-colored, grape-flavored compositions, there is often difficulty keeping the color stable. This is especially troublesome when using water containing free chlorine.

It is desirable to use tap water when preparing liquid compositions of the type described herein. This is because of its ready availability and low cost. However, one problem associated with tap water is free chlorine, which is a residue of a typical municipal sanitizing treatment. This free chlorine acts to bleach the color out of some liquid compositions, and particularly out of dark colored liquid compositions such as grape-flavored compositions. It would therefore be desirable to develop a dry mixture which can be used to prepare a liquid composition, preferably for human consumption, which is color-stable when prepared using tap water containing free chlorine. The present invention provides for such a dry mixture. It would also be desirable to develop a method for preparing a color-stable liquid composition prepared from tap water which contains free chlorine. The present invention also provides for such a method.

BACKGROUND ART

There are numerous processes known in the art for stabilizing color in foods and preventing discoloration of foods.

U.S. Pat. No. 3,814,820, issued Jun. 4, 1974, to Busta et al., discloses a process for treating a product selected from the group consisting of vegetables and fruits. The disclosed method comprises the steps of: (a) washing a product to be treated in an aqueous cleaning solution at a temperature of from 32°–70° F.; (b) promptly rinsing the washed product of step (a) with potable water; (c) contacting the rinsed product of step (b) with an aqueous sanitizing solution to thereby inactivate unwanted micro-organisms, said sanitizing solution comprising a chlorine-containing sanitizer selected from the group consisting of ascorbic acid and sulfur dioxide-producing discoloration inhibitors; and (d) removing excess solution of step (d) from said product.

U.S. Pat. No. 4,208,434, issued Jun. 17, 1980, to Iacobucci et al., discloses an improved process for formulating a color stable food containing bio-available vitamin C and an anthocyanic pigment of the type wherein said anthocyanic pigment and said bio-available vitamin C are combined with a food base prior to consumption, the improvement comprising providing said bio-available vitamin C in the form of ascorbic acid, or a soluble, non-toxic salt thereof, blockingly substituted at least one enolic OH function.

U.S. Pat. No. 4,590,079, issued May 20, 1986, to Nishimori et al., discloses that discoloration of meat products can be prevented by incorporating ascorbic acids, cysteine and/or cysteine, and aspartic acid, and optionally a starch hydrolyzate with a dextrose equivalent of 5 to 30, into meat products.

U.S. Pat. No. 4,937,085, issued Jun. 26, 1990, to Cherry et al., discloses a method of preventing the discoloration of potatoes. The disclosed method comprises cutting the potatoes for consumption and exposing the cut potatoes to a solution consisting essentially of citric acid in a weight percentage concentration of from about 0.5% to about 1.00% of the solution and cysteine in a weight percentage of about 0.01% to about 0.04% of the solution, and the remainder water, said exposing including contacting said potatoes with said solution for a time sufficient such that the contacting of the potatoes with said solution prevents discoloration of said potatoes when said potatoes are exposed to an atmosphere which would cause discoloration in the absence of said contacting.

Methods are also taught for treating water which contains chlorine with various agents.

U.S. Pat. No. 4,282,104, issued Aug. 4, 1981, to Pacini et al., disclose a method of treating a water supply to sanitize the water supply, reduce carcinogen concentration in the water supply, and prevent the formation of carcinogens in the water supply. The method comprises the steps of: (a) adding chlorine to the water supply to a concentration in excess of the amount needed to sanitize the water supply; and (b) adding a concentration of ascorbic acid thereto sufficient to inactivate an amount of chlorine equal to the excess of the chlorine over the amount needed to sanitize the water supply; wherein said concentration of ascorbic acid is sufficient to destroy existing carcinogens and prevent the formation of carcinogens while leaving a residual free concentration in the water supply sufficient to sanitize the water supply.

U.S. Pat. No. 5,192,571, issued Mar. 9, 1993, to Levy, discloses a process for removing chlorine from coffee and tea beverages. The chlorine is removed from the water used to prepare such beverages by treating said water with a material consisting of an alkali metal or alkaline earth metal thiosulfate selected from the group consisting of sodium thiosulfate, magnesium thiosulfate and calcium thiosulfate. The thiosulfate is used in a quantity that reacts with 60% to 100% of the chlorine in the water on a 0.25–1.00 to one molecular basis with the stoichiometric amount of chlorine present in said water.

As can be seen, nothing in this art teaches a dry mixture useful for making a color-stable liquid composition, when such composition is prepared with water containing free chlorine.

It is therefore an object of the present invention to provide a dry mixture which provides a color-stable liquid composition when combined with free chlorine-containing water.

It is another object of the present invention to provide a method of preparing such color-stable liquid compositions by mixing such dry mixture and water containing free chlorine.

These objects are accomplished by the invention described herein. Unless otherwise specified, the percentages provided herein are weight percentages.

SUMMARY OF THE INVENTION

The present invention relates to a dry mixture which provides a color-stable liquid composition when combined with free chlorine-containing water, said dry mixture comprising:

(a) from about 0.005% to about 0.035% by weight chlorine reactive agent;

(b) from about 0.5% to about 5.0% by weight electrolyte;

(c) coloring agent, wherein the dry mixture comprises sufficient coloring agent to provide for a concentration of coloring agent in the range of from about 5 ppm to about 200 ppm in a color-stable liquid composition prepared from said dry mixture; and (d) a balance of carbohydrate.

The present invention also relates to a method for preparing a color-stable liquid composition, said method comprising:

(a) preparing a dry mixture comprising:

(1) from about 0.005% to about 0.035% by weight chlorine reactive agent;

(2) from about 0.5% to about 5.0% by weight electrolyte;

(3) coloring agent, wherein the dry mixture comprises sufficient coloring agent to provide for a concentration of coloring agent in the range of from about 5 ppm to about 200 ppm in the color-stable liquid composition; and (4) a balance of carbohydrate.; and (b) combining said dry mixture with free chlorine-containing water, thereby producing a color-stable liquid composition;

wherein the weight ratio of water combined with dry mixture is in the range of from about 10.5:1 to about 22:1 (water:dry mixture), wherein the molar ratio of chlorine reactive agent contained in the dry mixture to free chlorine contained in the water is at least about 2.2:1 (chlorine reactive agent:free chlorine), and wherein the color-stable liquid composition comprises from about 5 ppm to about 200 ppm coloring agent.

DETAILED DESCRIPTION OF THE INVENTION

The present invention provides a dry mixture which, when combined with water containing free chlorine, provides a color-stable liquid composition. By the term "color-stable" it is meant that after a liquid composition is prepared with the dry mixture of the present invention and free chlorine-containing water, the coloring agents contained in said liquid composition are not oxidized (i.e., bleached out) by the presence of chlorine to a noticeable degree.

The dry mixture of the present invention comprises from about 0.005% to about 0.035%, preferably from about 0.020% to about 0.035%, more preferably from about 0.025% to about 0.035% by weight chlorine reactive agent.

In the context of the present invention, the term "chlorine reactive agent" means any reagent which reacts with free chlorine, as defined herein, to prevent the free chlorine from oxidizing or bleaching out the color of any liquid composition prepared by the dry mixture of the present invention.

The dry mixture can utilize any chlorine reactive agent known to those skilled in the art. Examples of chlorine reactive agents useful in the dry mixture of the present invention include, but are not limited to, erythorbic acid and its salts, astorbit acid and its salts, and mixtures thereof, with ascorbic acid being preferred. When such salts are utilized as the chlorine reactive agent, they are not considered as an electrolyte for purposes of formulating the dry mixture of the present invention.

When the preferred ascorbic acid is used, the dry mixture comprises from about 0.005% to about 0.4%, preferably from about 0.01% to about 0.05%, more preferably from about 0.02% to about 0.04% by weight ascorbic acid.

The dry mixture of the present invention also comprises a coloring agent. As with the chlorine reactive agents, any type of coloring agent known to those skilled in the art may be used in the present invention. Examples of useful coloring agents include, but are not limited to, Food, Drug & Cosmetic ("FD&C") Yellow #6, FD&C Red #40, FD&C Blue #1, FD&C Yellow #5, and FD&C Green #3, and mixtures thereof. It has been found that the color-stability benefit provided by the dry mixture of the present invention is most pronounced when the coloring agents FD&C Red #40, FD&C Blue #1, and mixtures thereof are used. For this reason, these coloring agents are preferred for use in the dry mixture of the present invention.

The dry mixture of the present invention comprises sufficient coloring agent to provide a coloring agent concentration in the range of from about 5 ppm to about 200 ppm, preferably from about 10 ppm to about 50 ppm, more preferably from about 15 ppm to about 25 ppm, in a color-stable liquid composition prepared by combining the dry mixture with water. To achieve such coloring agent concentrations in a final color-stable liquid product, the dry mixture of the present invention typically comprises from about 0.007% to about 0.3%, preferably from about 0.02% to about 0.1%, more preferably from about 0.02% to about 0.05% by weight coloring agent. Of course, the exact amount of coloring agent used will depend upon a number of factors, including the desired color intensity, desired final product color, ratio of dry mixture to water used to prepare a liquid composition, and the type of coloring agents used.

For example, according to the *CRC Handbook of Food Additives,* 2d. Ed., Vol. II, published by The Chemical Rubber Co., Cleveland, Ohio, an orange carbonated beverage comprises either 75 ppm of all FD&C Yellow #6 or 50 ppm of a mixture of 96 parts FD&C Yellow #6 and 4 parts FD&C Red #40; a cherry carbonated beverage comprises 100 ppm of a mixture of 99.5 parts FD&C Red #40 and 0.5 parts FD&C Blue #1; a grape carbonated beverage comprises 75 ppm of a mixture of 80 parts FD&C Red #40 and 20 parts FD&C Blue #1; a strawberry carbonated beverage comprises 60 ppm of all FD&C Red #40; a lime carbonated beverage comprises 20 ppm of a mixture of 95 parts FD&C Yellow #5 and 5 parts FD&C Blue #1; and a lemon carbonated beverage comprises 20 ppm of all FD&C Yellow #5.

When the preferred combination of FD&C Red #40 and FD&C Blue #1 is used to prepare the dry mixture of the present invention, the dry mixture comprises sufficient coloring agent to provide for a concentration of coloring agent in the range of from about 5 ppm to about 200 ppm, preferably from about 10 to about 50 ppm, more preferably from about 15 ppm to about 25 ppm in a color-stable liquid composition prepared by combining the dry mixture with water product. To achieve such coloring agent concentrations in a final color-stable liquid product, the dry mixture of the present invention typically comprises from about 0.005% to about 0.1%, preferably from about 0.01% to about 0.05%, more preferably from about 0.01% to about 0.03% by weight FD&C Red #40, and from about 0.002% to about 0.05%, preferably from about 0.002% to about 0.025%, more preferably from about 0.0025% to about 0.01% by weight FD&C Blue #1. In the preferred combination of FD&C Red #40 and FD&C Blue #1, the ratio of FD&C Red #40 to FD&C Blue #1 is in the range of from about 3.5:1 to 4.5:1, preferably from about 3.75:1 to 4.25:1, more preferably from about 3.9:1 to about 4.1:1 (FD&C Red #40:FD&C Blue #1).

Of course, the coloring agents of the present invention are susceptible to bleaching by free chlorine. If coloring agents are used which are not bleached by free-chlorine, then the chlorine reactive agents of the present invention are not necessary.

The dry mixture of the present invention also comprises from about 0.5% to about 5.0%, preferably from about 1.0% to about 4.0%, more preferably from about 2.0% to about 3.0% by weight of an electrolyte. Any electrolyte known to those skilled in the art may be used in the present invention. Examples of electrolytes useful herein include, but are not limited to, sodium chloride, potassium chloride, monopotassium phosphate, dipotassium phosphate, sodium citrate, potassium citrate, and mixtures thereof, with a mixture of sodium chloride, sodium citrate, and monopotassium phosphate being preferred.

When this preferred electrolyte mixture is used, the dry mixture comprises from about 0.3% to about 1.5%, preferably from about 0.6% to about 1.2%, more preferably from about 0.8% to about 1.0% by weight sodium chloride; from about 0.3% to about 1.5%, preferably from about 0.6% to about 1.2%, more preferably from about 0.8% to about 1.0% by weight sodium citrate; and from about 0.2% to about 1.0%, preferably from about 0.4% to about 0.8%, more preferably from about 0.5% to about 0.7% by weight monopotassium phosphate.

The balance of the dry mixture of the present invention comprises a carbohydrate. The dry mixture preferably comprises from about 70% to about 96%, more preferably from about 80% to about 94%, still more preferably from about 90% to about 93% by weight carbohydrate.

Any carbohydrate known to those skilled in the art may be used in dry mixture of the present invention. Of course, the carbohydrates have to be in dry form when used in the dry mixture of the present invention. Examples of carbohydrates useful in the dry mixture include, but are not limited to, sucrose, dextrose, maltodextrin, fructose, corn syrup solids, and mixtures thereof, with a mixture of sucrose and dextrose being preferred.

When the preferred mixture of sucrose and dextrose is used, the dry mixture of the present invention comprises from about 35% to about 95%, preferably from about 55% to about 75%, more preferably from about 60% to about 70% by weight sucrose; and from about 1% to about 50%, preferably from about 10% to about 40%, more preferably from about 20% to about 30% by weight dextrose.

The weight ratio of chlorine reactive agent to coloring agent in the dry mixture is preferably in the range of from about 60:1 to about 2:1, more preferably from about 20:1 to about 2:1, still more preferably from about 4:1 to about 3:1 (chlorine reactive agent:coloring agent).

The dry mixture may also comprise optional ingredients. Examples of optional ingredients useful in the dry mixture included, but are not limited to, natural and artificial flavors.

When natural and artificial flavors are included as ingredients, the dry mixture comprises from about 0.05% to about 0.8%, preferably from about 0.1% to about 0.5%, more preferably from about 0.15% to about 0.2% by weight natural and artificial flavors.

After being combined, the components of the dry mixture are mixed until the dry mixture is substantially uniform. Any method of mixing known to those skilled in the art may be used when preparing the dry mixture of the present invention. Examples of mixing methods known to those skilled in the art include, but are not limited to, mixing the ingredients in one of the following apparatuses: a ribbon mixer, a vee-blender, an air impingement mixer, a paddle mixer, a vertical screw mixer, and a fluidized bed, with a ribbon mixer being preferred.

When the ribbon mixer is used to prepare the dry mixture of the present invention, the dry mixture ingredients are charged into the mixer and mixed at a speed in the range of from about 50 to about 200 rpm, preferably from about 100 to about 200 rpm, more preferably from about 125 to about 175 rpm, for a period of time in the range of from about 5 to about 20 min., preferably from about 7 to about 18 min., more preferably from about 10 min. to about 15 min.

The present invention also relates to a method of preparing a color-stable liquid composition. The method comprises initially preparing a dry mixture in the manner already described herein. The dry mixture is prepared by combining and mixing the ingredients already described herein in the proportions described herein, including any desirable optional ingredients. As far as is known, the ingredients may be combined in any manner known to those skilled in the art. Of course, it is preferred to mix the dry ingredients to obtain a substantially uniform distribution of the individual ingredients in the dry mixture. This provides for a liquid composition of more uniform quality.

Once the dry mixture is prepared, it is combined with water which contains free-chlorine, thereby producing a color-stable liquid composition. By "free chlorine" it is meant that the water contains either hypochlorous acid (HOCl) or the hypochlorite ion (OCl$^-$), either of which is capable of reacting with other organic constituents present in the liquid environment. The free chlorine is typically present in the water due to municipal water treatment processing wherein chlorine is added as a sanitizing agent. Following the sanitizing process there is usually residual free chlorine contained in the treated water. This residual free chlorine, if untreated, acts to oxidize the coloring agents present in the liquid composition, thereby bleaching out the color in the liquid composition.

The concentration of chlorine in the water will depend upon a number of factors, such as the level of sanitizing agent used in the particular water treatment process in question, the proximity of the water to the treatment plant, and the length of time since the water was treated. The length of time affects the chlorine concentration because the concentration tends to diminish over time. Typical chlorine concentrations encountered in municipally treated water range from about 0.1 ppm to about 10 ppm, more typically from about 0.3 ppm to about 3 ppm, still more typically from about 0.5 ppm to about 1 ppm.

The water and dry mixture are combined in weight ratio of water to dry mixture in the range of from about 10.5:1 to about 22:1, preferably from about 12:1 to about 18:1, more preferably from about 13:1 to about 15:1 (water:dry mixture).

The dry mixture and water can be combined in any manner known to those skilled in the art. In the usual manner in which the method of the present invention is practiced, the consumer combines the dry mixture with tap water to prepare the color-stable liquid composition. This tap water typically contains free chlorine. The color-stable liquid composition is then typically mixed, for example with a spoon, until the dry mixture is completely dissolved.

For any liquid composition prepared from the dry mixture and free chlorine-containing water to be color-stable, the dry mixture must provide a sufficient weight ratio of chlorine reactive agent to free chlorine to inhibit the color-bleaching activity of the chlorine. Of course there are a number of variables which have to be considered when calculating this weight ratio. Specifically, the concentration of the chlorine reactive agent of the dry mixture, the weight ratio of dry mixture to water, and the concentration of free chlorine in the water. It has been found that the molar ratio of chlorine reactive agent contained in the dry mixture to free chlorine contained in the water must be at least about 2.2:1 (chlorine reactive agent:free chlorine). Preferably, this molar ratio of chlorine reactive agent to free chlorine falls within the range of from about 10:1 to about 2:1, more preferably from about 5:1 to about 2:1, still more preferably from about 3:1 to about 2:1.

The color-stable liquid composition prepared by the process of the present invention also comprises from about 5 ppm to about 200 ppm, preferably from about 10 ppm to about 50 ppm, still more preferably from about 15 ppm to about 25 ppm coloring agent. As already described herein, the exact concentration of coloring agent will depend upon factors such as the desired color intensity, desired final product color, ratio of dry mixture to water used to prepare a liquid composition, and the type of coloring agents used.

When the preferred combination of FD&C Red #40 and FD&C Blue #1 is used to prepare the dry mixture of the present invention, the color-stable liquid composition prepared by the process of the present invention comprises from about 5 ppm to about 200 ppm, preferably from about 10 ppm to about 50 ppm, more preferably from about 15 ppm to about 25 ppm coloring agent. In the preferred combination of FD&C Red #40 and FD&C Blue #1, the ratio of FD&C Red #40 to FD&C Blue #1 is in the range of from about 3.5:1 to 4.5:1, preferably from about 3.75:1 to 4.25:1, more preferably from about 3.9:1 to about 4.1:1 (FD&C Red #40:FD&C Blue #1).

As already stated herein, after a liquid composition is prepared with the dry mixture of the present invention and free chlorine-containing water, the coloring agents contained in said liquid composition are not oxidized (i.e., bleached out) to a noticeable degree by the presence of free chlorine. While there will be some oxidation reaction between the coloring agents and the free-chlorine, the amount will minimal due to the presence of the chlorine reactive agent. Furthermore, any reactions between the free chlorine and coloring agents will occur substantially immediately after mixing. This further contributes to the color stability of the liquid composition.

The present invention is further illustrated, but not limited by, the following examples.

EXAMPLES

Example 1

A dry mixture of the following formula is prepared:

| Ingredient | Weight Percent |
| --- | --- |
| Sucrose | 67.197 |
| Dextrose | 26.516 |
| Citric Acid | 3.500 |
| Salt Blend | 2.549 |
| Ascorbic Acid | 0.029 |
| FD&C Red #40 | 0.021 |
| FD&C Blue #1 | 0.006 |
| Flavoring Agents | 0.182 |
| TOTAL | 100.000 |

The above dry mixture is prepared by combining 2700 lb. sucrose, 1095 lb. dextrose, 144 lb. citric acid, 105 lb. salt blend, 1.2 lb. ascorbic acid, 0.86 lb. FD&C Red #40, 0.28 lb. FD&C Blue #1, and 7.5 lb. flavoring agents in a ribbon mixer.

After being combined, the dry ingredients are mixed on high speed for a period of 10 minutes. The final product is a dry mixture having substantially uniformly mixed ingredients.

Example 2

A color-stable liquid beverage is prepared by mixing 66.25 grams of the dry mixture of example 1 with 896.25 grams of water in a 1.0 L, non-metallic container. The water and dry mixture are mixed using a spoon until all the dry mixture is dissolved. The water contains 3.0 ppm free chlorine.

What is claimed is:

1. A dry mixture which provides a color-stable liquid composition when combined with free chlorine-containing water, said dry mixture comprising:

(a) from about 0.005% to about 0.035% by weight chlorine reactive agent;

(b) from about 0.5% to about 5.0% by weight electrolyte;

(c) coloring agent, wherein the dry mixture comprises sufficient coloring agent to provide for a concentration of coloring agent in the range of from about 5 ppm to about 200 ppm in a color-stable liquid composition prepared from said dry mixture; and (d) a balance of carbohydrate.

2. A dry mixture according to claim 1 comprising from about 0.020% to about 0.035% by weight chlorine reactive agent, from about 1.0% to about 4.0% electrolyte, from about 80% to about 94% by weight carbohydrate, and sufficient coloring agent to provide for a concentration of coloring agent in the range of from about 10 ppm to about 50 ppm in a color-stable liquid composition prepared from said dry mixture.

3. A dry mixture according to claim 2 wherein the carbohydrate is selected from the group consisting of sucrose, dextrose, maltodextrin, fructose, corn syrup solids, and mixtures thereof, wherein the electrolyte is selected from the group consisting of sodium chloride, potassium chloride, monopotassium phosphate, dipotassium phosphate, sodium citrate, potassium citrate, and mixtures thereof, wherein the chlorine reactive agent is selected from the group consisting of erythorbic acid and its salts, and ascorbic acid and its salts, and mixtures thereof, and wherein the coloring agent is selected from the group consisting of FD&C Red #40, FD&C Blue #1, and mixtures thereof.

4. A dry mixture according to claim 3 comprising from about 0.025% to about 0.035% by weight chlorine reactive agent, from about 2.0% to about 3.0% electrolyte, and from about 90% to about 93% by weight carbohydrate, and sufficient coloring agent to provide for a concentration of coloring agent in the range of from about 15 ppm to about 25 ppm in a color-stable liquid composition prepared from said dry mixture.

5. A dry mixture according to claim 2 comprising from about 60% to about 70% by weight sucrose, from about 20% to about 30% weight dextrose, from about 0.8% to about 1.0% by weight sodium chloride, from about 0.5% to about 0.7% by weight monopotassium phosphate, from about 0.8% to about 1.0% by weight sodium citrate, and from about 0.02% to about 0.04% by weight ascorbic acid, wherein the coloring agent is a mixture of FD&C Red #40 and FD&C Blue #1, wherein the dry mixture comprises sufficient coloring agent to provide for a concentration of coloring agent in the range of from about 15 ppm to about 25 ppm in a color-stable liquid composition prepared from said dry mixture, and wherein the ratio of FD&C Red #40 to FD&C Blue #1 is in the range of from about 3.5:1 to about 4.5:1 (FD&C Red #40:FD&C Blue #1).

6. A dry mixture according to claim 5 wherein the weight ratio of ascorbic acid to coloring agent is in the range of from about 4:1 to about 3:1 (chlorine reactive agent:coloring agent), and wherein the ratio of FD&C Red #40 to FD&C Blue #1 is in the range of from about 3.75:1 to about 4.25:1 (FD&C Red #40:FD&C Blue #1).

7. A method of preparing a color-stable liquid composition, said method comprising:
(a) preparing a dry mixture comprising:
(1) from about 0.005% to about 0.035% by weight chlorine reactive agent;
(2) from about 0.5% to about 5.0% by weight electrolyte;
(3) coloring agent, wherein the dry mixture comprises sufficient coloring agent to provide for a concentration of coloring agent in the range of from about 5 ppm to about 200 ppm in the color-stable liquid composition; and
(4) a balance of carbohydrate; and
(b) combining said dry mixture with free chlorine-containing water, thereby producing a color-stable liquid composition;
wherein the weight ratio of water combined with dry mixture is in the range of from about 10.5:1 to about 22:1 (water:dry mixture), wherein the molar ratio of chlorine reactive agent contained in the dry mixture to free chlorine contained in the water is at least about 2.2:1 (chlorine reactive agent:free chlorine), and wherein the color-stable liquid composition comprises from about 5 ppm to about 200 ppm coloring agent.

8. A method according to claim 7 wherein the dry mixture comprises from about 0.020% to about 0.035% by weight chlorine reactive agent, from about 1.0% to about 4.0% electrolyte, from about 80% to about 94% by weight carbohydrate, and sufficient coloring agent to provide for a concentration of coloring agent in the range of from about 10 ppm to about 50 ppm in the color-stable liquid composition, wherein the weight ratio of water combined with dry mixture is in the range of from about 12:1 to about 18:1 (water:dry mixture), wherein the molar ratio of chlorine reactive agent contained in the dry mixture to free chlorine contained in the water is in the range of from about 10:1 to about 2:1 (chlorine reactive agent:free chlorine), and wherein the color-stable liquid composition comprises from about 10 ppm to about 50 ppm coloring agent.

9. A method according to claim 8 wherein the carbohydrate is selected from the group consisting of sucrose, dextrose, maltodextrin, fructose, corn syrup solids, and mixtures thereof, wherein the electrolyte is selected from the group consisting of sodium chloride, potassium chloride, monopotassium phosphate, dipotassium phosphate, sodium citrate, potassium citrate, and mixtures thereof, wherein the chlorine reactive agent is selected from the group consisting of erythorbic acid and its salts, and ascorbic acid and its salts, and mixtures thereof, and wherein the coloring agent is selected from the group consisting of FD&C Red #40, FD&C Blue #1, and mixtures thereof.

10. A method according to claim 9 wherein the dry mixture comprises from about 0.025% to about 0.035% by weight chlorine reactive agent, from about 2.0% to about 3.0% electrolyte, and from about 90% to about 93% by weight carbohydrate, and sufficient coloring agent to provide for a concentration of coloring agent in the range of from about 15 ppm to about 25 ppm in the color-stable liquid composition, wherein the molar ratio of chlorine reactive agent contained in the dry mixture to free chlorine contained in the water is in the range of from about 3:1 to about 2:1 (chlorine reactive agent:free chlorine), and wherein the color-stable liquid composition comprises from about 15 ppm to about 25 ppm coloring agent.

11. A method according to claim 8 wherein the dry mixture comprises from about 60% to about 70% by weight sucrose, from about 20% to about 30% weight dextrose, from about 0.8% to about 1.0% by weight sodium chloride, from about 0.5% to about 0.7% by weight monopotassium phosphate, from about 0.8% to about 1.0% by weight sodium citrate, from about 0.02% to about 0.04% by weight ascorbic acid, and sufficient coloring agent to provide for a concentration of coloring agent in the range of from about 15 ppm to about 25 ppm in the color-stable liquid composition, wherein the coloring agent is a mixture of FD&C Red #40 and FD&C Blue #1, wherein the ratio of FD&C Red #40 to FD&C Blue #1 is in the range of from about 3.5:1 to about 4.5:1 (FD&C Red #40:FD&C Blue #1), and wherein the weight ratio of water combined with dry mixture is in the range of from about 13:1 to about 15:1 (water:dry mixture), wherein the molar ratio of chlorine reactive agent contained in the dry mixture to free chlorine contained in the water is in the range of from about 3:1 to about 2:1 (chlorine reactive agent:free chlorine), and wherein the color-stable liquid composition comprises from about 15 ppm to about 25 ppm coloring agent.

12. A method according to claim 11 wherein the weight ratio of ascorbic acid to coloring agent in the dry mixture is in the range of from about 4:1 to about 3:1 (chlorine reactive agent:coloring agent), and wherein the ratio of FD&C Red #40 to FD&C Blue #1 in the dry mixture is in the range of from about 3.75:1 to about 4.25:1 (FD&C Red #40:FD&C Blue #1).

13. A method according to claim 12 wherein the water comprises from about 0.1 ppm to about 10 ppm free chlorine.

14. A method according to claim 13 wherein the water comprises from about 0.3 ppm to about 3 ppm free chlorine.

* * * * *